US010645585B2

United States Patent
Kaushik et al.

(10) Patent No.: US 10,645,585 B2
(45) Date of Patent: *May 5, 2020

(54) CONTAINING INTERNET OF THINGS (IOT) ANALYTICS POISONING ON WIRELESS LOCAL ACCESS NETWORKS (WLANS)

(71) Applicant: Fortinet, Inc., Sunnyvale, CA (US)

(72) Inventors: Anil Kaushik, Marathalli Bangalore (IN); Naga Kishore Reddy Tarimala, Bengaluru (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,850

(22) Filed: Aug. 20, 2018

(65) Prior Publication Data

US 2019/0045364 A1 Feb. 7, 2019

Related U.S. Application Data

(63) Continuation of application No. 15/088,110, filed on Mar. 31, 2016, now Pat. No. 10,057,776.

(51) Int. Cl.
| | | |
|---|---|---|
| H04W 12/12 | (2009.01) | |
| H04B 17/318 | (2015.01) | |
| G01S 5/00 | (2006.01) | |
| H04W 36/16 | (2009.01) | |
| H04L 12/24 | (2006.01) | |
| H04L 29/06 | (2006.01) | |
| H04W 84/12 | (2009.01) | |

(Continued)

(52) U.S. Cl.
CPC ............... *H04W 12/12* (2013.01); *G01S 5/00* (2013.01); *H04B 17/318* (2015.01); *H04L 41/12* (2013.01); *H04L 63/1483* (2013.01); *H04W 12/1206* (2019.01); *H04W 36/16* (2013.01); *H04L 2463/121* (2013.01); *H04W 4/70* (2018.02); *H04W 36/08* (2013.01); *H04W 84/12* (2013.01); *H04W 88/06* (2013.01)

(58) Field of Classification Search
CPC . H04W 12/12; H04W 12/1206; H04W 88/06; H04W 84/12; H04L 63/1483; H04L 41/12; H04L 41/14; H04L 2463/121; H04B 17/318
See application file for complete search history.

(56) References Cited

U.S. PATENT DOCUMENTS

| | | |
|---|---|---|
| 9,031,538 B2 | 5/2015 | Snider |
| 2005/0197136 A1 | 9/2005 | Friday et al. |

(Continued)

OTHER PUBLICATIONS

Pires, W. R., et al. "Malicious node detection in wireless sensor networks." Parallel and distributed processing symposium, 2004. Proceedings. 18th international. IEEE, 2004. (Year: 2004).*

(Continued)

*Primary Examiner* — Robert B Leung
(74) *Attorney, Agent, or Firm* — Law Office of Dorian Cartwright; Dorian Cartwright (57) ABSTRACT

An analytics containment system store RSSI values of connected stations and corresponding time stamps. If two or more stations have RSSI values within a certain proximity within a certain time period, a first condition for identifying analytics poisoning has been satisfied. Additionally, if RSSI values for the two or more stations changes at similar rate, the stations have satisfied a second optional condition.

10 Claims, 5 Drawing Sheets

(51) Int. Cl.
  *H04W 88/06*   (2009.01)
  *H04W 36/08*   (2009.01)
  *H04W 4/70*    (2018.01)

(56) References Cited

U.S. PATENT DOCUMENTS

| | | |
|---|---|---|
| 2006/0068811 A1 | 3/2006 | Adya et al. |
| 2007/0249288 A1* | 10/2007 | Moallemi ............ H04L 63/0492 |
| | | 455/68 |
| 2009/0046654 A1 | 2/2009 | Hoshi et al. |
| 2010/0328076 A1 | 12/2010 | Kyle et al. |
| 2011/0302632 A1* | 12/2011 | Garrett ................... G06Q 20/10 |
| | | 726/4 |
| 2014/0141714 A1* | 5/2014 | Ghosh ................... H04W 4/023 |
| | | 455/39 |
| 2015/0200957 A1 | 7/2015 | Zhang et al. |
| 2015/0215762 A1 | 7/2015 | Edge |
| 2015/0334131 A1 | 11/2015 | Harvey et al. |
| 2015/0349810 A1 | 12/2015 | Baxley et al. |
| 2016/0249281 A1 | 8/2016 | Sahni |
| 2017/0063823 A1* | 3/2017 | Cheng ................... H04W 76/10 |

OTHER PUBLICATIONS

Tippenhauer, Nils Ole, et al. "Attacks on public WLAN-based positioning systems." Proceedings of the 7th international conference on Mobile systems, applications, and services. ACM, 2009. (Year: 2009).*

* cited by examiner

CONTAINING INTERNET OF THINGS (IOT) ANALYTICS POISONING ON WIRELESS LOCAL ACCESS NETWORKS (WLANS)

CROSS-REFERENCE TO RELATED APPLICATIONS

This application claims priority as a continuation of U.S. patent application Ser. No. 15/088,110, filed Mar. 31, 2016, the contents of which hereby incorporated by reference in its entirety.

FIELD OF THE INVENTION

The invention relates generally to Wi-Fi computer networking, and more specifically, to transferring calls between a cellular network to a Wi-Fi network at a specified quality.

BACKGROUND

Mobile devices are becoming a standard accessory for people in commercial and business environments, as much as car keys and purses. In contrast to conventional accessories, mobile devices have the ability to communicate with WLANs and other networks while on the move. This communication allows entities to collect analytics about, for example, consumer behavior while in a store, from both an individual level and an aggregate level. As a result, WLAN powered analytics is a booming resource.

Of course, new fronts in network technology also open up new vulnerabilities for exploitation from malicious hackers and processes. For example, one computing device can be configured to appear as several different stations by emulating multiple Wi-Fi network interface cards that are actually virtual. Each NIC card, having its own MAC address, can appear as a separate device to the network. In turn, analytics can be poisoned with the injection of false data.

What is needed is a robust technique for detecting analytics poisoning attacks by identifying emulated stations from tracking RSSI (received signal strength indicator) values.

SUMMARY

The above-mentioned shortcomings are addressed by an analytics containment system, methods and computer-readable media for tracking RSSI values of stations to identify emulated stations from multiple flows.

In one embodiment, an analytics containment system store RSSI values of connected stations and corresponding time stamps. If two or more stations have RSSI values within a certain proximity within a certain time period, a first condition for identifying analytics poisoning has been satisfied. Additionally, if RSSI values for the two or more stations changes at similar rate, the stations have satisfied a second optional condition.

A third optional condition is satisfied by observing RSSI values after handoffs between network devices. As a user moves between coverage ranges of different access points, the emulated stations will be handed off to different access points for reaching the backbone network. A centralized Wi-Fi controller in contact with each of the access points can detect movements between access points. In response, the analytics containment system can identify that the two or more stations are handed off around the same time which serves as additional evidence of emulated stations on a single physical device.

A fourth optional condition is satisfied by applying heuristics to the data being collected. For example, if each of the two or more stations are injecting the same data into the system, for example, by all being associated with a single user account, all meeting the same requirement or goal, or any other situation in which multiple stations would skew analytics, the data injection can be suspicious.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

An analytics containment system, methods and computer-readable medium for tracking RSSI values of stations to identify emulated stations, is disclosed.

Figure 1:
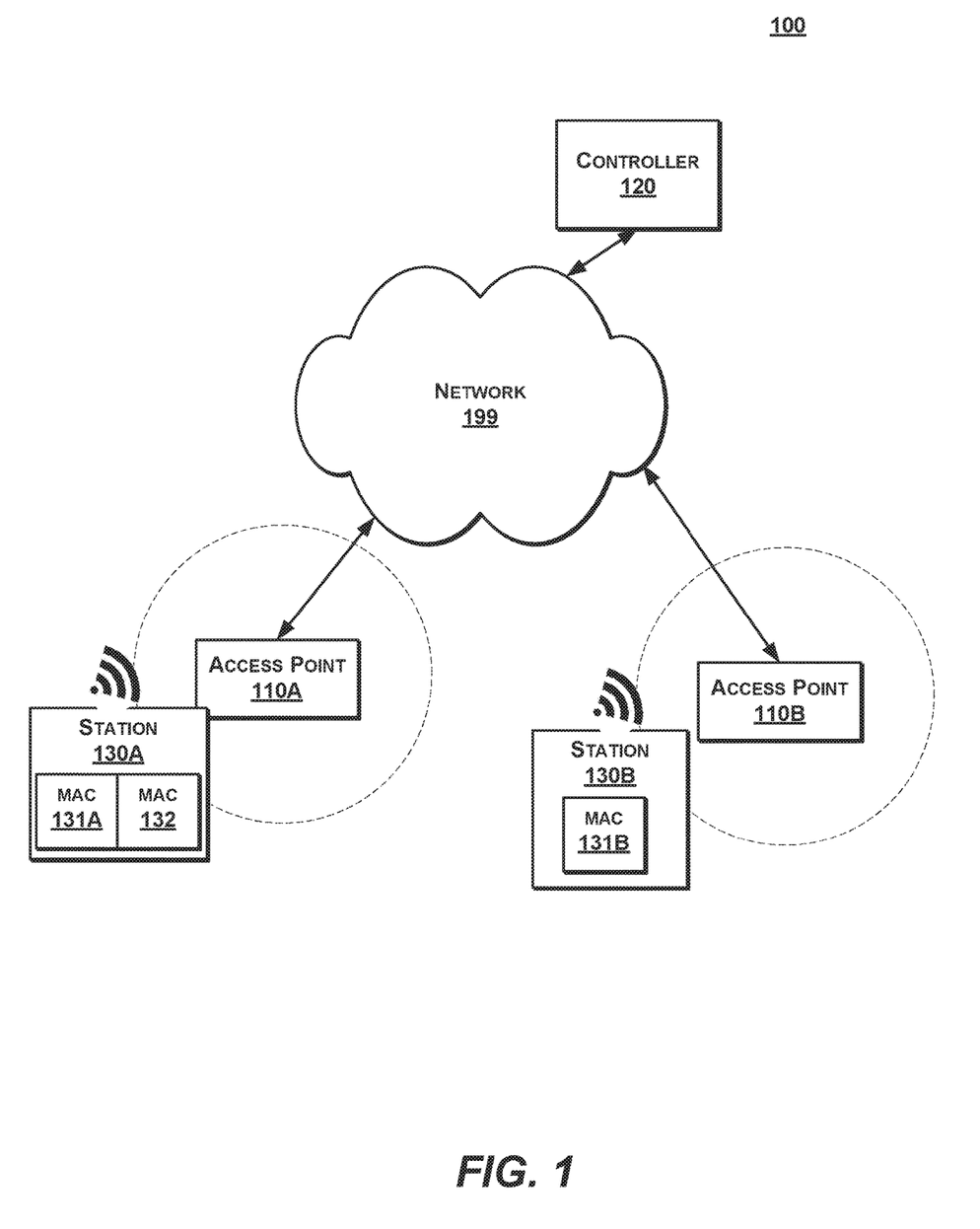
FIG. 1 is a block diagram illustrating an analytics containment system for tracking RSSI values of stations to identify emulated stations for analytics poisoning, according to an embodiment.
Figure 2:
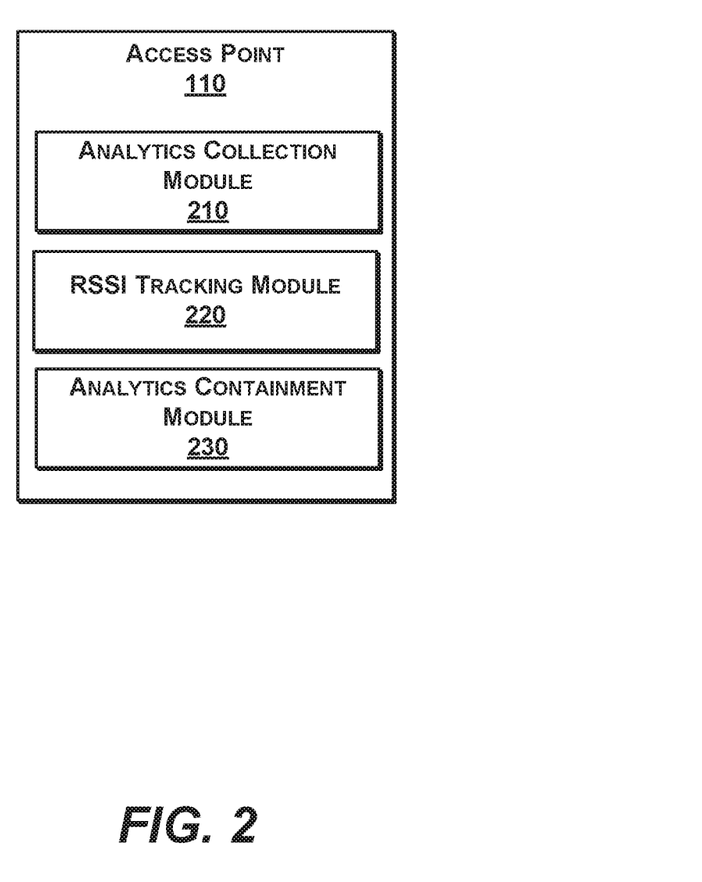
FIG. 2 is a more detailed block diagram illustrating an analytics server of FIG. 1, according to an embodiment.

Analytics Containment System (FIGS. 1-2)

FIG. 1 is a block diagram illustrating an analytics containment system 100 for tracking RSSI values of stations to identify emulated stations for analytics poisoning, according to an embodiment. The system 100 comprises an access points 110A-110B, a Wi-Fi controller 120, and stations 130A-130B, each coupled to a network 199. Additional network components can also be part of the system 100, such as firewalls, virus scanners, routers, switches, application servers, databases, as well as additional controllers, access points, access switches, stations, SDN (Software-Defined Networking) controllers, Wi-Fi controllers, and the like. For instance, embodiments of the system 100 can be implemented in conjunction with a network security system, for example, the FortiGate Network Security platform by Fortinet of Sunnyvale, Calif. The network components can be implemented as hardware, software, or a combination of both.

The access points 110A-110B handle network traffic exchanges between the stations 130A-130B (and other devices) and other network devices in communication with the network 199. The access points 110A-110B receive, store and analyze analytics data collected from the stations 130A-130B, such as location. Other stored data can be related to station characteristics, capabilities, behaviors (e.g., user purchases and URL visits), and the like. RSSI values for different stations 130A-130B are also collected and tracked, in particular, changes in RSSI values are tracked. When the RSSI values of two different stations remain connected, the access points 110A-110B can raise a flag so that analytics data is treated suspiciously. As a result, corresponding analytics data can be ignored, discounted, quarantined, deleted, or allowed to process as usual.

Another optional indicator of analytics poisoning is revealed by applying heuristics to the data being collected. For example, if each of the two or more stations are injecting the same data into the system, for example, by all being associated with a single user account, all meeting the same requirement or goal, or any other situation in which multiple stations would skew analytics, the data injection can be suspicious.

In other operations, the access point 110 can perform standard operations such as BSSID (Blind Service Set Identifier) advertisement beacons. When a station responds to the beacon, as indicated by returning the BSSID, a connection request initiates a Wi-Fi connection between the access point 110 and station. In some network architectures, the controller 120 manages the multiple access points from a network-wide perspective, and provides network-wide tracking of RSSI data for stations.

Figure 5:
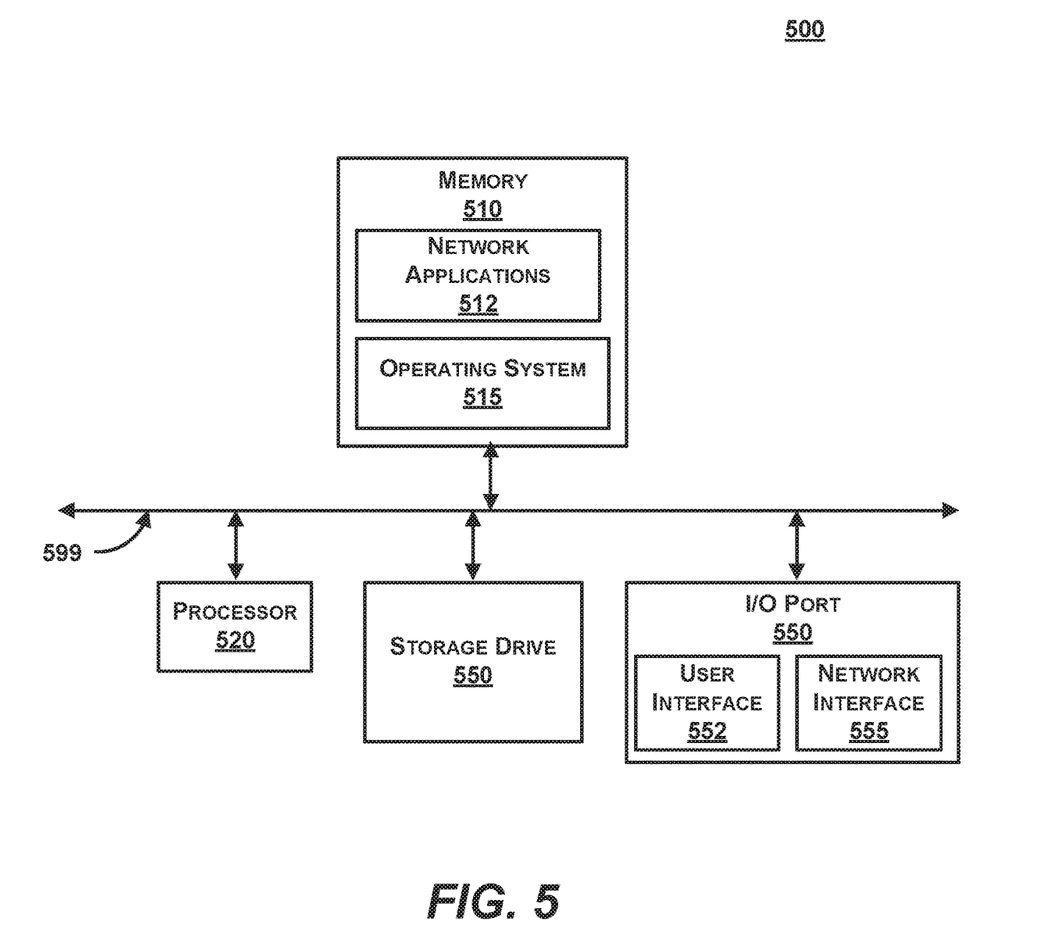
FIG. 5 is a block diagram illustrating an exemplary computing device, according to one embodiment.

Physically, the access point 110 include one or more individual access points implemented in any of the computing devices discussed herein (e.g., see FIG. 5). For example, the access point 110 can be an AP 110 or AP 433 (modified as discussed herein) by Meru Networks of Sunnyvale, Calif. A network administrator can strategically place the access point 110 for optimal coverage area over a locale. The access point 110 can, in turn, be connected to a wired hub, switch or router connected to the enterprise network (or an external network). In embodiment, access point functionality is incorporated into a switch or router. In another embodiment, the access point 110 is a virtual device. The access point 110 is set forth in more detail below with respect to FIG. 2.

In other embodiments, the techniques described herein are implemented in a network device, which could be an access point. However, the network device can also be a controller, a router, a gateway, a server, or any other processor-driven device configured as described herein.

The controller 120 provides a network-wide tracking of RSSID values for stations that move from access point to access point. For example, if the station 130A moves from access point 110A to access point 110B, the latter does not have information from the former unless a bridge is completed by the controller 120, having management processes over both devices. In one embodiment, the controller 120 can force a hand-off or roam of a suspicious station and reconfirm the closeness or RSSI values.

The stations 130A-130B are preferably mobile devices connected with a user (e.g., shopper), and can more generally comprise a smart phone, a personal computer, a network-enabled television or other appliance, tablet devices, and the like. Any processor-driven device capable of receiving multicast video streaming can also be a station. Of note, station 130A includes two MACs 131A and 132, which can be two physical MAC cards or virtual MAC addresses implemented in software. The duality allows the station 130A double up the analytics data, or with more MACs to triple, quadruple, or even worse. A user in conspiracy to collect additional data or who is unintentionally collecting additional data, degrades the integrity of aggregate data collections. On the other hand, the station 110B has just a single MAC 131B. One mechanism of poisoning attacks is guest Wi-Fi access which uses captive portal authentication at a maximum.

Wireless components preferably use communication protocols such as IEEE 802.11 n and IEEE 802.11 ac wave 2, in addition to other protocols such as other IEEE 802.11s, IEEE 802.3, Bluetooth, 3G and 4G. The network can serve, for example, a business enterprise, a hospital or system of hospital, school, building, a private network, or the like. The enterprise network can provide access to a wide area network or the Internet in some embodiments. Alternatively, the network can be distributed over the Internet, in other embodiments. A combination of wired and wireless devices can be connected, as well as only wireless devices or only wired devices. The network can be, for example, the Internet, a cellular network, a larger wide area network to which the enterprise network is a smaller component of, or a combination of network types.

FIG. 2 is a more detailed block diagram illustrating an analytics server of FIG. 1, according to an embodiment. The access point 110 (generically representing the access point 110A and the access point 110B) comprises an analytics collection module 210, an RSSI tracking module 220, and an analytics containment module 230. Many other configurations are possible. Other modules and electronics can be included, such as those components shown in FIG. 5. The components can be implemented in hardware, software, or a combination of both.

The analytics collection module 210 collects analytics data for various situations. One use case is tracking location. For example, locations of a user device can be tracked through a mall. Information is collected on, for example, how long the user device was located in certain stores. The data is valuable marketing data and behavior data for the store owners, that is more valuable as pristine data that has not been manipulated. The data can be locally or remotely stored and analyzed for various purpose. In one embodiment, the analytics collection module 210 is communicatively coupled to a processor, a network interface, and a memory of the access point 110.

The RSSI tracking module 220 receives RSSI values from stations connected to access points, along with a time stamp. The RSSI value is used as an indicator of distance away from access points because the RSSI value typically drops as stations move away and the RSSI value typically raises as stations move closer. If two stations that are supposed to be representative of different users with two physically independent devices, only in rare cases would RSSI values be tied together. In one case, a single user can carry two smartphones, or two users can remain in close proximity. Over time, however, there should be slight variations on RSSI values that exemplify the physical independence of devices. On the other hand, a single device, emulating multiple devices through multiple MAC cards or the like will retain closely correlated RSSI values virtual devices. A predetermined RSSI proximity threshold can determine the sensitivity of tracking (e.g., an RSSI difference of −1 dbm to −3 dbm can indicate suspicious activity), set either manually or automatically. In one example, the devices are tracked after being handed-off from one access point to another access point, as further verification of physical unity. If the suspicious condition is detected, a bit or signal is generated. In one embodiment, the RSSI tracking module 220 is communicatively coupled to the processor, and the analytics collection module 210.

In other embodiments, suspicion can be raised by a data flow from a station. In particular, a flow changing above a predetermined rate can be suspicious. A device type can indicate application access to flows, and more access can raise greater suspicion (e.g., laptop creating flow which is marked as Fitbit app). If a total invalid protocol or destination numbers is greater than a threshold for a given MAC address, its reliability can be reduced. An alternative RSSI value can be determined by using multiple RF chains. In more detail, many access points are now 3×3 and can be used to derive RSSI values to confirm suspicions.

The analytics containment module 230 acts to prevent contamination of the analytics collected by the analytics collection module 210. Responsive to detection of suspicious RSSI value correlations, the corresponding analytics data from the two or more suspicious devices can be ignored, discounted, quarantined, or deleted. A notification can be sent to an administrator. In one embodiment, the analytics containment module 230 is communicatively coupled to the processor, and the RSSI tracking module 220.

Figure 3:
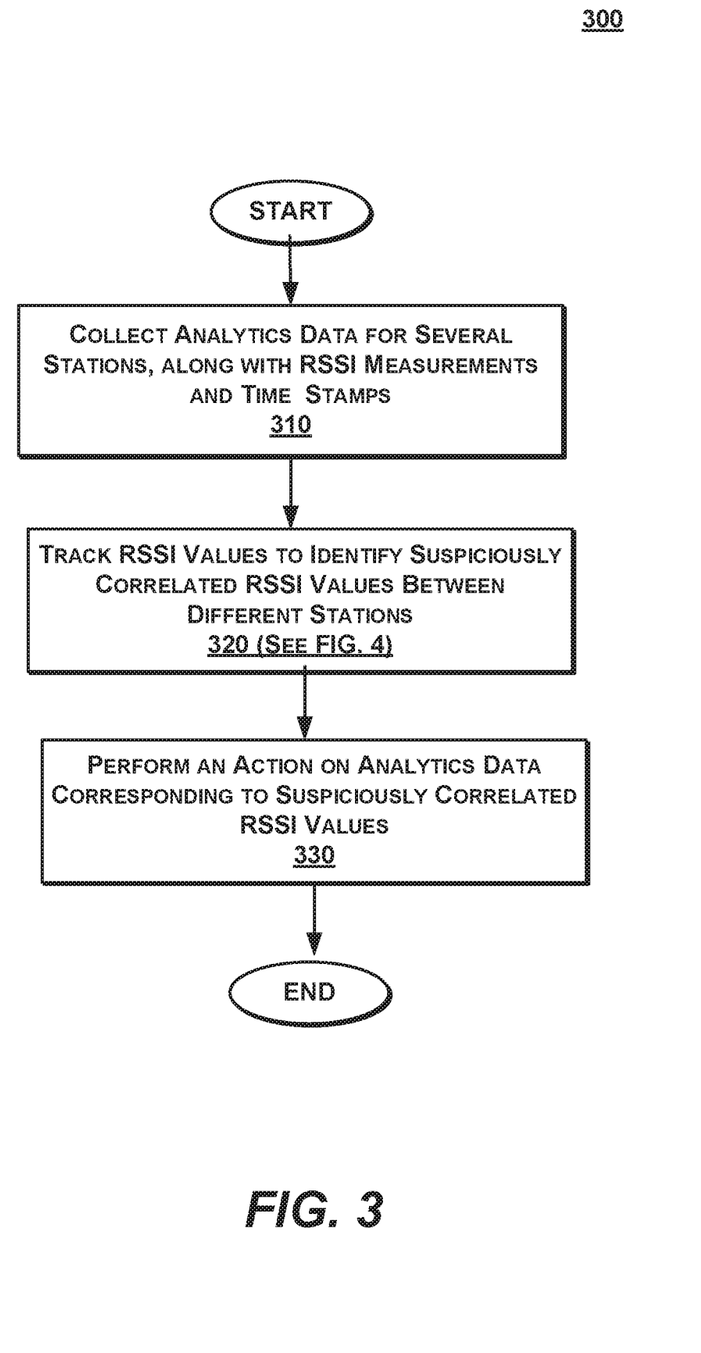
FIG. 3 is a flow chart illustrating a method tracking RSSI values of stations to identify emulated stations for analytics poisoning, according to an embodiment.
Figure 4:
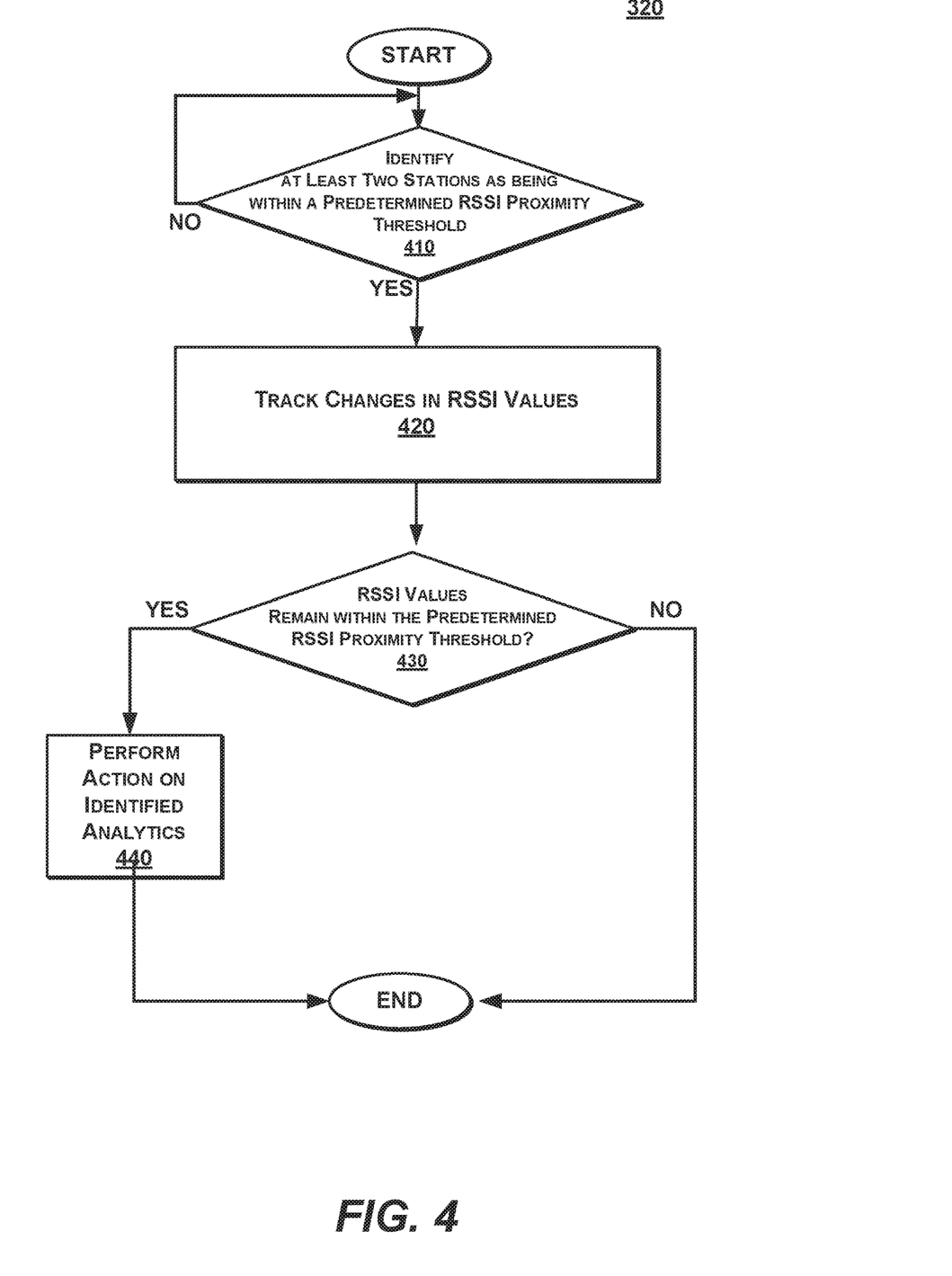
FIG. 4 a more detailed flow chart illustrating the step of FIG. 3 for tracking RSSI values to identify suspiciously correlated RSSI values between different stations, according to an embodiment.

Methods for Analytics Containment (FIGS. 3-4)

FIG. 3 is a flow chart illustrating a method 300 tracking RSSI values of stations to identify emulated stations for analytics poisoning, according to an embodiment. The process at a high-level is implementable by computer hardware, wherein individual components can perform individual steps of a method.

In method 300, analytics data is collected for several stations along with RSSI measurements and time stamps (step 310). RSSI values are tracked to identify suspiciously correlated RSSI values between different stations (step 320), an example of which is set forth below with respect to FIG. 4. An action is performed on analytics data corresponding to the suspiciously correlated RSSI values (step 330).

One of ordinary skill in the art will recognize that the method 300 (and others) is non-limiting as other embodiments can have more or less steps and can be performed in a different order. The method 300 can be implemented in the system 100 of FIG. 1 or in other components.

FIG. 4 a more detailed flow chart illustrating the step 320 of tracking RSSI values to identify suspiciously correlated RSSI values between different stations, according to an embodiment.

RSSI values for at least two stations is identified as being within a predetermined RSSI proximity threshold (step 410). The threshold can be different for different types of device pairs, and can be manually or automatically set. Changes in RSSI values are tracked (step 420). If the RSSI value changes remain within the predetermined RSSI proximity threshold (step 430), analytics data received from the at least two stations is identified (step 440). Otherwise the process continues.

In some embodiments, the transmissions can switch if the number of multicast members crosses a threshold. In other embodiment, the threshold is automatically determined by an amount of processing resources necessary for a network device to maintain unicast conversions. In other words, processor loads, memory storage and packet latency can become strained with too many unicast conversions for a multicast stream.

Generic Computing Device (FIG. 5)

FIG. 3 is a block diagram illustrating an exemplary computing device 300 for use in the system 100 of FIG. 1, according to one embodiment. The computing device 300 is an exemplary device that is implementable for each of the components of the system 100, including the access points 110A-110B, the controller 120 and the stations 130A-130B. The computing device 300 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 300, of the present embodiment, includes a memory 310, a processor 320, a storage drive 330, and an I/O port 340. Each of the components is coupled for electronic communication via a bus 399. Communication can be digital and/or analog, and use any suitable protocol.

The memory 310 further comprises network applications 312 and an operating system 314. The network applications 312 can include the modules of the access point 110 or other components. Other network applications 312 can include a web browser, a mobile application, an application that uses networking, a remote application executing locally, a network protocol application, a network management application, a network routing application, or the like.

The operating system 314 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 3 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 320 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 320 can be single core, multiple core, or include more than one processing elements. The processor 320 can be disposed on silicon or any other suitable material. The processor 320 can receive and execute instructions and data stored in the memory 310 or the storage drive 330

The storage drive 330 can be any non-volatile type of storage such as a magnetic disc, EEPROM, Flash, or the like. The storage drive 330 stores code and data for applications.

The I/O port 340 further comprises a user interface 342 and a network interface 344. The user interface 342 can output to a display device and receive input from, for example, a keyboard. The network interface 344 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11ac, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an analytics server for containing analytics poisoning by identifying emulated stations on a WLAN, the method comprising the steps of:
   receiving analytics data from a plurality of stations along with RSSI (received signal strength indicator) measurements and time stamps for each data receipt;
   identifying RSSI values from at least two stations from the plurality of stations that are within a predetermined RSSI proximity threshold;
   tracking changes in RSSI values to determine whether the two stations have a change in RSSI values within a predetermined RSSI change proximity threshold;
   detecting RSSI changes for the at least two stations remaining within the predetermined RSSI proximity threshold;
   responsive to the RSSI changes detection, identifying analytics data received from the at least two stations; and
   perform an action on the identified analytics data.

2. The method of claim 1, further comprising:
   detecting a hand-off between at least two access points for the two stations within a predetermined handoff proximity threshold; and
   responsive to meeting the predetermined RSSI proximity threshold after the hand-off, identifying the associated analytics data as suspicious.

3. The method of claim 2, wherein the controller detects RSSI changes connected between the at least two access points.

4. The method of claim 3, wherein the controller has management control over both of the at least two access points.

5. The method of claim 1, wherein the step of performing the action comprises at least one of: ignoring, discounting, quarantining, and deleting the identified analytics data.

6. The method of claim 1, further comprising:
   detecting RSSI changes for the at least two stations that no longer remain within the predetermined RSSI proximity threshold; and
   discontinuing performance of the action on the identified analytics data.

7. The method of claim 1, further comprising:
   responsive to the RSSI changes detections, forcing a hand-off of at least one of the at least two stations; and
   prior to performing an action, reconfirming the RSSI changes detection as remaining with the predetermined RSSI proximity threshold.

8. The method of claim 1, wherein the predetermined RSSI proximity threshold includes −1 dbm and −3 dbm as indicative of suspicious.

9. A non-transitory computer-readable medium, storing instructions that, when executed by a processor, perform a method in an analytics server for containing analytics poisoning by identifying emulated stations on a WLAN, the method comprising the steps of:
   receiving analytics data from a plurality of stations along with RSSI (received signal strength indicator) measurements and time stamps for each data receipt;
   identifying RSSI values from at least two stations from the plurality of stations that are within a predetermined RSSI proximity threshold;
   tracking changes in RSSI values to determine whether the two stations have a change in RSSI values within a predetermined RSSI change proximity threshold;
   detecting RSSI changes for the at least two stations remaining within the predetermined RSSI proximity threshold;
   responsive to the RSSI changes detection, identifying analytics data received from the at least two stations; and
   perform an action on the identified analytics data.

10. An analytics server for containing analytics poisoning by identifying emulated stations on a WLAN, the analytics server comprising:
    a processor;
    a network interface;
    a memory;
    an analytics collection module, coupled in communication with the processor, to receive analytics data from a plurality of stations along with RSSI (received signal strength indicator) measurements and time stamps for each data receipt;
    an RSSI tracking module, coupled in communication with the processor and analytics collection module, the RSSI tracking module to identify RSSI values from at least two stations from the plurality of stations that are within a predetermined RSSI proximity threshold, the RSSI tracking module to track changes in RSSI values to determine whether the two stations have a change in RSSI values within a predetermined RSSI change proximity threshold, the RSSI tracking module to detect RSSI changes for the at least two stations remaining within the predetermined RSSI proximity threshold; and
    an analytics containment module, coupled in communication with the processor and the RSSI tracking module to, responsive to the RSSI changes detection, identify analytics data received from the at least two stations, the analytics containment module to perform an action on the identified analytics data.

* * * * *